United States Patent [19]

Balakrishnan et al.

[11] Patent Number: 5,121,332

[45] Date of Patent: Jun. 9, 1992

[54] CONTROL SYSTEM FOR SHEETMAKING

[75] Inventors: Ramesh Balakrishnan, Stanford; George M. Butler, San Jose, both of Calif.

[73] Assignee: Measurex Corporation, Cupertino, Calif.

[21] Appl. No.: 332,256

[22] Filed: Mar. 31, 1989

[51] Int. Cl.⁵ .................... G06F 15/46; G05B 13/04; G05B 13/02; G05B 11/01
[52] U.S. Cl. .................... 364/471; 364/151; 364/157; 364/177
[58] Field of Search ............ 364/151, 157, 149, 158, 364/164, 471, 724.01, 176, 553, 177

[56] References Cited

U.S. PATENT DOCUMENTS

| | | | |
|---|---|---|---|
| 3,610,899 | 10/1971 | Dahlin | 235/151.35 |
| 4,346,433 | 8/1982 | Rutledge | 364/162 |
| 4,368,510 | 1/1983 | Anderson | 364/151 |
| 4,407,013 | 9/1983 | Arcara et al. | 364/149 |
| 4,423,594 | 1/1984 | Ellis | 364/149 X |
| 4,578,747 | 3/1986 | Hideg et al. | 364/151 |
| 4,602,326 | 7/1986 | Kraus | 364/158 |
| 4,646,226 | 2/1987 | Moon | 364/149 |
| 4,707,779 | 11/1987 | Hu | 364/148 |
| 4,805,126 | 2/1989 | Rodems | 364/571.01 |
| 4,814,968 | 3/1989 | Fukumoto | 364/177 |
| 4,893,262 | 1/1990 | Kalata | 364/567 |

OTHER PUBLICATIONS

Bahill, A. T., "A Simple Adaptive Smith-Predictor for Controlling Time-Delay Systems", *Control Systems Magazine*, vol. 3, No. 2 (May, 1983) pp. 16-22.

DiStefano III et al., Theory and Problems of Feedback and Control Systems, 1967, pp. 13-14.

*Primary Examiner*—Jerry Smith
*Assistant Examiner*—Jim Trammell
*Attorney, Agent, or Firm*—Burns, Doane, Swecker and Mathis

[57] ABSTRACT

A time delay compensation control system for use in controlling a sheetmaking process includes a controller operated according to the Smith Predictor control scheme and means to automatically adjust the closed-loop time constant of the controller in inverse relationship to the system error or to the signal-to-noise ratio of the system output signals.

24 Claims, 3 Drawing Sheets

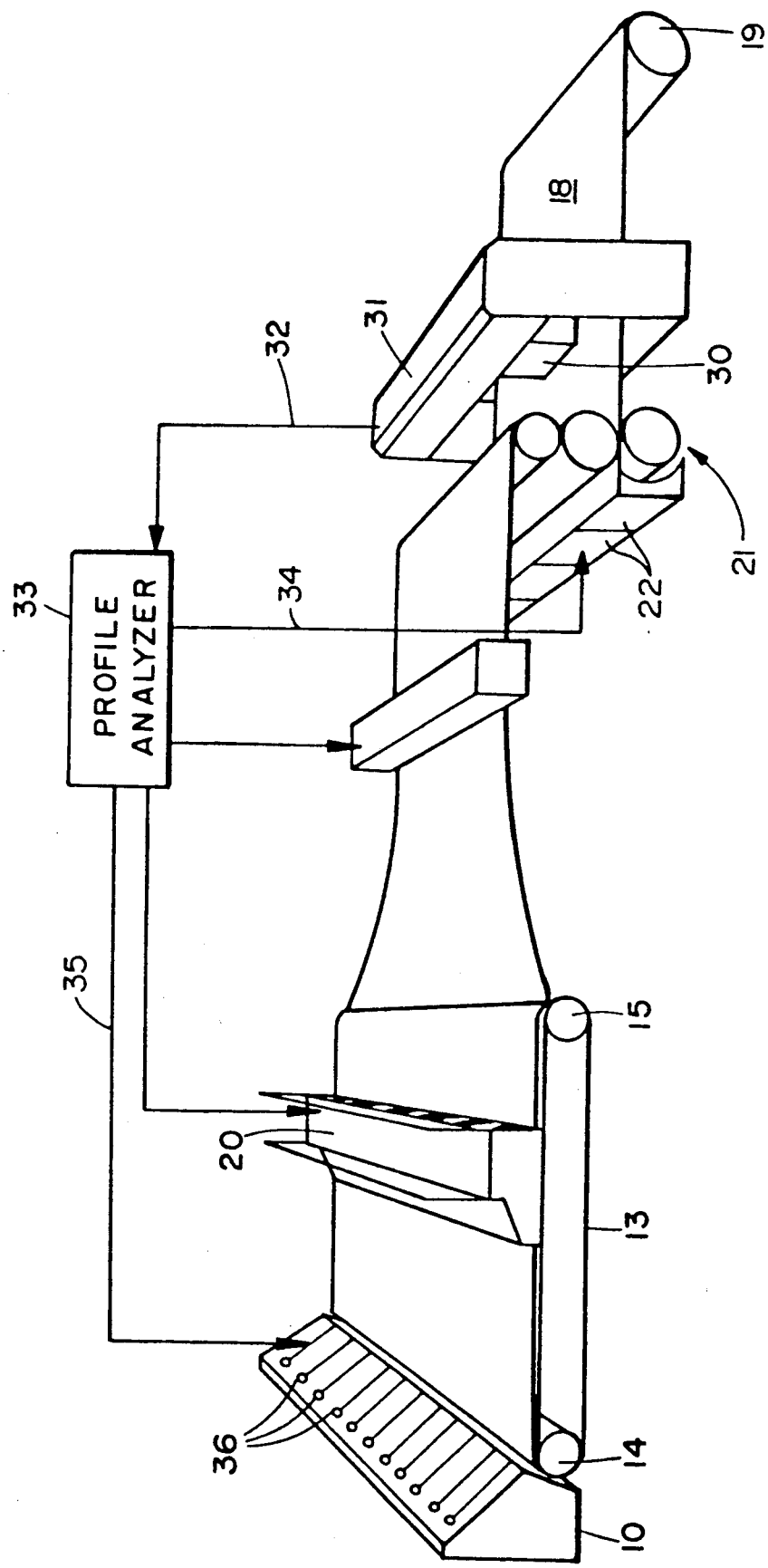
FIG._1.

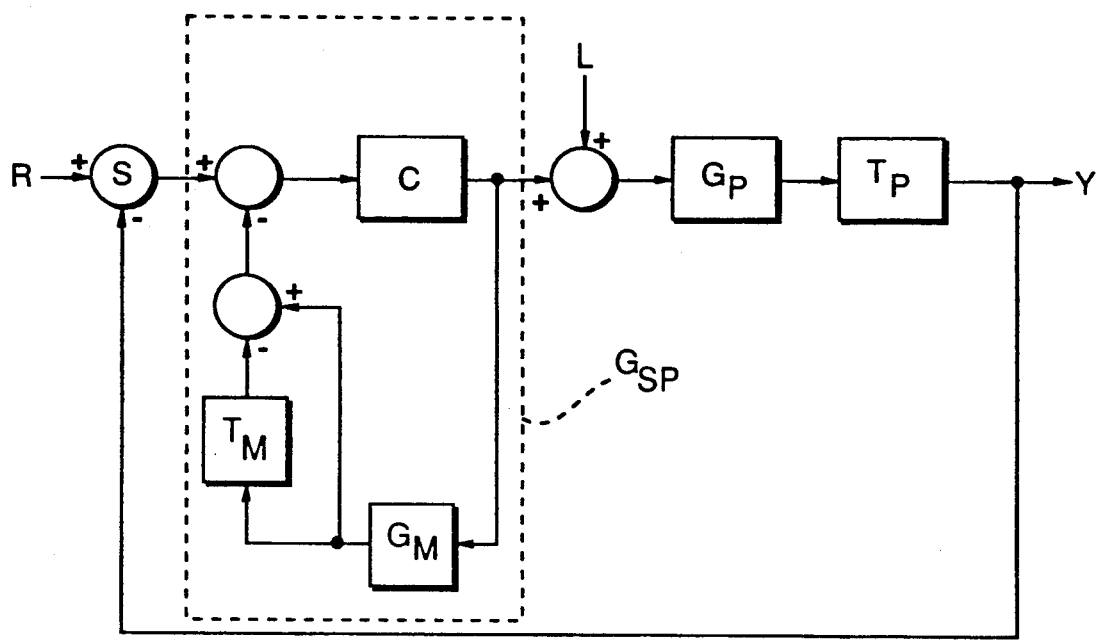
FIG._2 *(PRIOR ART)*
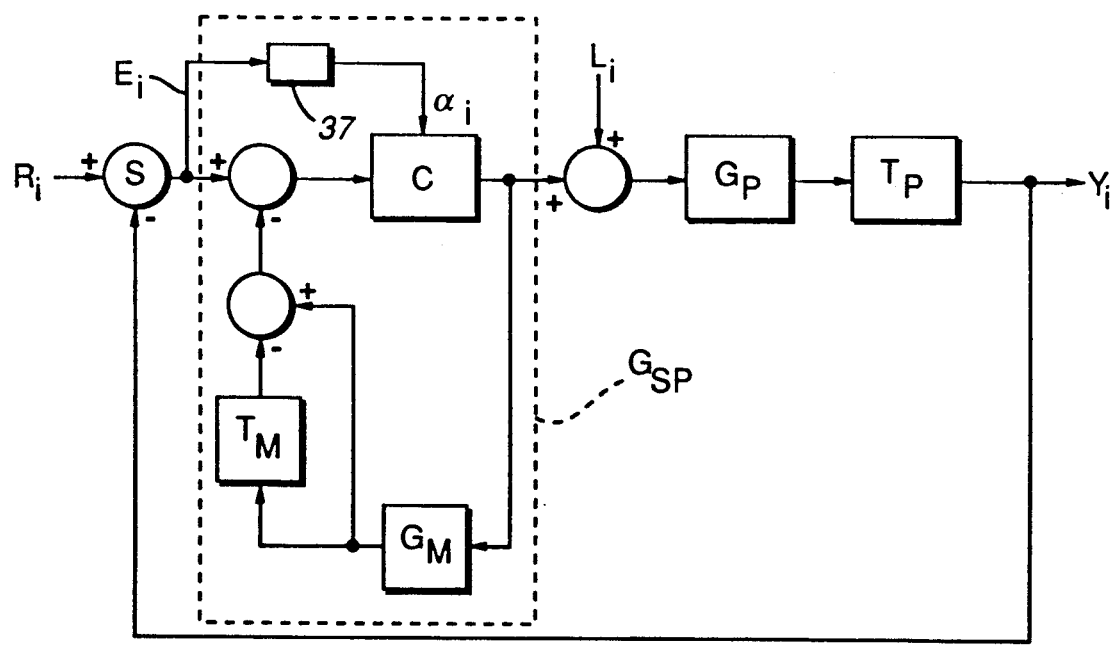
FIG._3

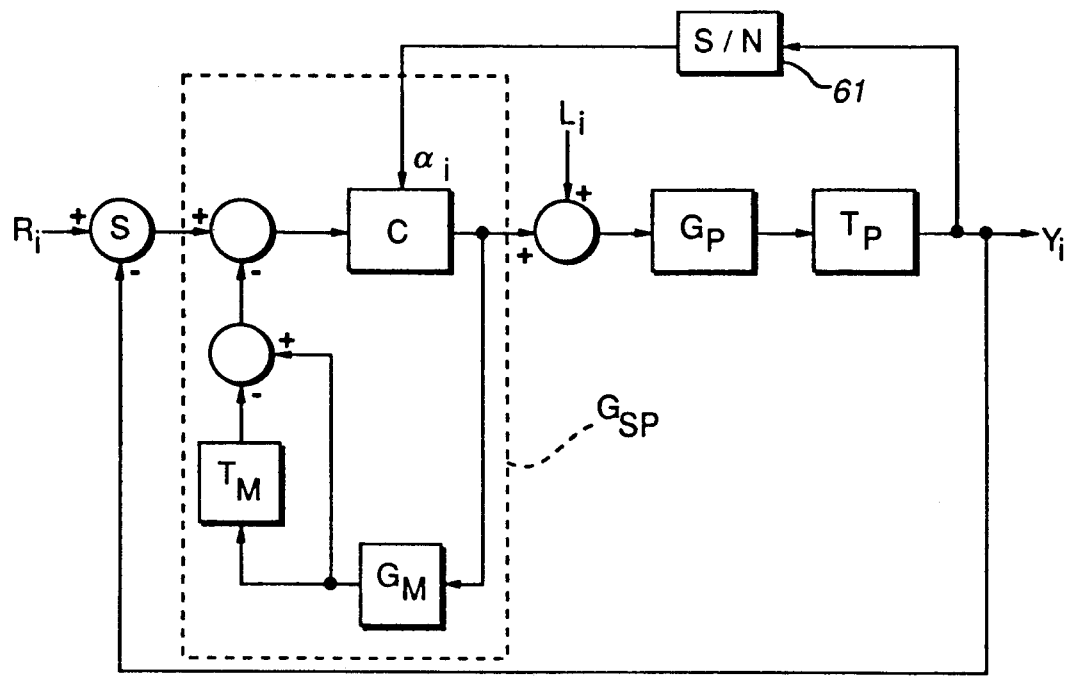
FIG._4
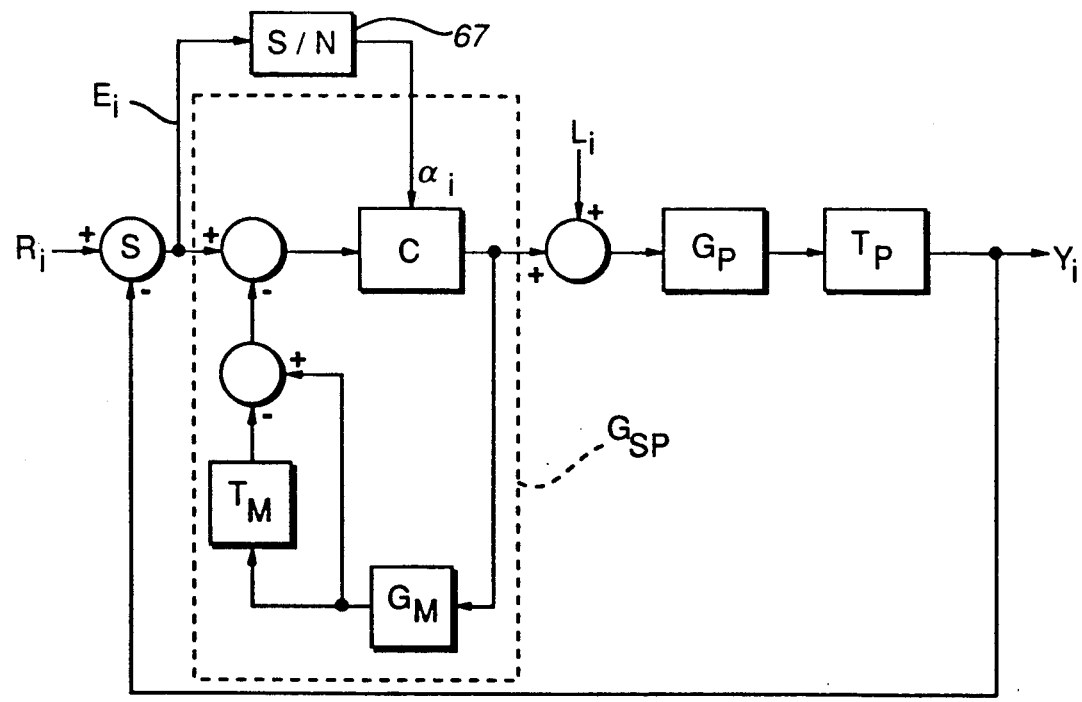
FIG._5

CONTROL SYSTEM FOR SHEETMAKING

BACKGROUND OF THE INVENTION

The present invention generally relates to the control of high-speed sheetmaking machines.

One shortcoming of conventional systems for controlling the operation of high-speed sheetmaking machines is that the response times of the systems are relatively slow following abrupt changes in process conditions such as caused by sheet breaks, reel or grade changes, or during start-up. The slow responses of the control systems assure control stability under normal operating conditions but may allow substantial quantities of substandard sheet material to be produced before effective corrective actions are implemented following abrupt process changes.

In the sheetmaking art, it is well known to use the Smith Predictor control scheme. This control scheme is described in an article entitled "A Simple Adaptive Smith-Predictor for Controlling Time-Delay Systems," T. Bahill, IEEE Control Systems Magazine, Vol. 3, No. 2 (May, 1983) pp. 16-22. The Smith Predictor control scheme is often employed in time delay compensation control systems, which is to say in systems having "dead times." Accordingly, the Smith-Predictor control scheme is appropriate for use in sheetmaking systems because there are unavoidable delays between the times at which sheets are acted upon by manufacturing equipment and the times at which sheet properties are measured.

In control systems incorporating the Smith Predictor control scheme, errors in estimating the gains and time constants of the systems can cause control instabilities. Thus, in conventional practice, controllers in systems based upon the Smith Predictor control scheme are tuned to achieve long-term stability at the expense of rapid responses to transient conditions. Another way of stating this is to say that, conventionally, controller parameters in Smith Predictor systems are selected so that the systems respond relatively slowly, but stably, to detected variations in a property being controlled.

In view of the foregoing discussion, it can be appreciated that there is a need for control systems that rapidly adjust sheetmaking systems when process conditions change abruptly but, under normal conditions, provide smooth and stable operation.

SUMMARY OF THE INVENTION

The present invention provides improvements in the control of high-speed sheetmaking operations after abrupt process changes and during start-up periods. Generally speaking, the control system of the invention comprises a time delay compensation control system according to the Smith Predictor control scheme wherein the closed-loop time constant of the controller is automatically adjusted. In the preferred embodiment, the control system of the invention comprises a time delay compensation control system of the Dahlin type wherein the closed-loop time constant is automatically adjusted in inverse relationship to system error or to the signal-to-noise ratio of the output signals from the control system.

BRIEF DESCRIPTION OF THE DRAWINGS

The present invention can be further understood by reference to the following description and attached drawings which illustrate the preferred embodiments of the present invention. In the drawings:

FIG. 1 is a pictorial view of an example of a conventional sheetmaking machine;

FIG. 2 is a functional block diagram of a control system known in the art;

FIG. 3 is a functional block diagram of a control system according to the present invention;

FIG. 4 is a functional block diagram of an alternative embodiment of a control system according to the present invention; and FIG. 5 is a functional block diagram of yet another alternative embodiment of a control system according to the present invention.

DETAILED DESCRIPTION OF THE PREFERRED EMBODIMENT

FIG. 1 shows an example of a conventional machine for producing continuous sheet material. In the illustrated embodiment, the sheetmaking machine includes a feed box 10 which discharges raw material, such as paper pulp, onto a supporting web 13 trained between rollers 14 and 15. Further, the sheetmaking machine includes various processing stages, such as a calendaring stack 21, which operate upon the raw material to produce a finished sheet 18 which is collected onto a reel 19. In modern high-speed sheetmaking machines, such as papermaking machines, typical sheet velocities are about ten to fifteen inches per second.

In conventional sheetmaking practice, the processing stages along the machine of FIG. 1 each include actuators for controlling the properties of sheet 18 at adjacent cross-directional locations, often referred to as "slices." Thus, for example, calendering stack 21 includes actuators 22 for controlling the compressive pressure applied to sheet 18 at various slice locations. In the following, the various actuators are referred to collectively as profile actuators. The profile actuators normally are independently adjustable.

Further in the system of FIG. 1, at least one on-line sensor 30 is mounted on the sheetmaking machine to provide control information (i.e., measurements of a selected sheet property) for operating the profile actuators. In the papermaking art, on-line sensors are well known for detecting variable sheet properties such as basis weight, moisture content, and caliper. In the illustrated embodiment, on-line sensor 30 is a scanning sensor which is mounted on a supporting frame 31 which extends across the sheetmaking machine in the cross direction. Further, sensor 30 is connected, as by line 32, to provide signals to a profile analyzer 33. The signals indicate the magnitude of the measured sheet property at various cross-directional measurement points. In turn, profile analyzer 33 is connected to control the profile actuators at the various processing stages of the sheetmaking machine. For example, line 34 carries control signals from profile analyzer 33 to the profile actuators at calender stack 21, and line 35 carries control signals to profile actuators 3 at feedbox 10.

It should be understood that profile analyzer 33 is a conventional signal processor that includes a control system which operates in response to sheet measurements. One example of such an analyzer is the Mini-Slice (TM) signal processor available from Measurex Corporation of Cupertino, Calif.

In operation of the system of FIG. 1, sensor 30 periodically traverses sheet 18 in the cross direction at generally constant speed while measureing sheet properties. It should be noted that there are unavaoidable delays between the time the sheet is operated upon by the profile actuators and the time the sheet properties are measured. In the case of the calender profile actuators 22, for instance, the delay is equal at least to the time required for sheet 18 to travel from calender stack 21 to sensor 30.

FIG. 2 generally shows a conventional control system for use with a profile analyzer for a sheetmaking system such as the one shown in FIG. 1. The control system comprises the serial combination of a controller C, a simulator $G_P$ which models the dynamics of the open-loop characteristics of the sheetmaking system, and a delay element $T_p$ which simulates the dead time inherent in the sheetmaking system. Further, the control system of FIG. 1 includes a summing element S which receives negative feedback from the output of the system. For simplicity, the feedback gain is shown as unity.

The signals associated with the control system of FIG. 2 are designated R, L and Y. The signal R represents a selected reference level, and the signal L represents a load disturbance. The signal Y represents the actuating signal output provided by the control system.

In general terms, the control system of FIG. 2 can be characterized as a time delay compensation system with disturbance rejection. The system generally operates such that output Y is relatively independent of input L but closely tracks any changes in reference signal level R; that is, the system generally operates to maintain the measured sheet properties within specified limits regardless of plant disturbances. In the preferred embodiment, the system is one of the Dahlin design. The Dahlin design can be generally characterized by the following closed-loop transfer function, K, for discrete (i.e., digital) signals z:

$$K(z) = \frac{[1 - e^{-\lambda T}] z^{-k-1}}{1 - e^{-\lambda T} z^{-1}} \quad (1)$$

In equation (1), T designates time and $\lambda$ designates the inverse of the closed-loop time constant $\alpha$. Dahlin control systems are further described in *Industrial Digital Control Systems*, K. Warwick and D. Rees (Peter Peregrinus, Ltd., London; 1986) pp. 76–82 and 100. The closed-loop time constant $\alpha$, a parameter of the control system, is often referred to as the tuning factor. Depending upon the order of the control system, there may be two or more tuning factors; for example, a third order system could have three tuning factors. The smaller the value selected for a tuning factor, the more responsive or "tighter" the control system operates. In practice, tuning factors usually are under software control.

The dashed box labeled $G_{sp}$ in FIG. 2 comprises circuitry and control algorithms according to the Smith Predictor control scheme. In functional terms, the Smith Predictor control scheme provides closed-loop negative feedback to controller C. For example, the following transfer function applies in the first order case:

$$G_{sp} = \frac{C}{1 + CG_m(1 - T_m)} \quad (2)$$

In equation (2), $G_m$ represents a preselected model of the plant dynamics and $T_m$ represents a preselected model of the plant time delay.

The controller C in FIG. 2 can be implemented in any one of several conventional embodiments and still be suitable for use in a Smith Predictor control scheme. For example, the controller can be a PI (Proportional plus Integral) controller, a PD (Proportional plus Derivative) controller, or a PID (Proportional plus Integral plus Derivative) controller. Workers skilled in the art will recognize that the order of the controller will affect the transfer function expression.

One embodiment of a control system for sheetmaking according to the present invention is shown in FIG. 3. The signals associated with the system of FIG. 3 are designated $R_i$, $Y_i$, L and $E_i$. The input signals $R_i$ represent selected reference levels for various slice locations. In mathematical terms, input signals $R_i$ can be described as a vector whose ith component is the selected reference level of a sheet property at the ith slice location. The signals Li represent load disturbances. The output signals $Y_i$ can be described as a vector whose ith component is the actuator signal associated with the ith slice location or with the ith zone of profile actuator. In practice, the signals $Y_i$ determine the setpoints of the profile actuators which operate upon the sheet during manufacture. The error signals $E_i$ represent the difference between the output of the control system and the reference signals at slice locations; that is, $E_i = R_i - Y_i$. The error signals $E_i$ each have transient and steady-state components.

Structurally, the control system of FIG. 3 is similar to the one of FIG. 2 except that it includes a means for automatically adjusting the closed-loop time constant $\alpha$ of the controller C in inverse relationship to the system error. More particularly, the system in FIG. 3 includes a means 37 which is connected between the summing element S and the controller C to receive error signals $E_i$ from the output of summer S and to provide an output which determines the closed loop time constant $\alpha$; as a function of the error signals; that is $\alpha_i = f(E_i)$.

In accordance with one embodiment of the present invention, the error signals $E_i$ determine the value of the closed-loop time constant $\alpha_i$ of the Smith Predictor controller via an inverse functional relationship. In other words, a relatively large value of an error signal $E_i$ will produce a relative small value for the closed-loop time constant and, conversely, a relatively small value of an error signal $E_i$ will produce a relatively large value for the closed-loop time constant. The relationship between the error signals and the closed-loop time constant can also be expressed by saying that the closed-loop time constant is inversely adaptive to system error.

In the preferred embodiment of the system of FIG. 3, the functional relationship between the error signals $E_i$ and the closed-loop time constants $\alpha_i$ is as follows for any given slice location:

$$\alpha_i = \left[1 + \frac{E_{nom}}{E_i}\right] T_c \quad (3)$$

In equation (3), $E_{nom}$ is the nominal error of the system and $T_c$ is the open-loop time constant of the system. In practice, the value of $E_{nom}$ is determined by statistical methods and, preferably, is set equal to about twice the standard deviation of the error signals $E_i$. For a given control system, the open-loop time constant, $T_c$, is a fixed and measurable quantity.

According to equation (3), the value of the closed-loop time constant $_i$ will approach the value of the open-loop time constant $T_c$ when the error values $E_i$ are relatively large. Conversely, for relatively small error values, the closed-loop time constant could exceed the open-loop time constant. However, when the nominal error, $E_{nom}$, is set equal to about twice the standard deviation of the error signals, the closed-loop time constant typically will have the following relationship to the open-loop time constant:

$$T_c \leq a_i \leq 2T_c. \tag{4}$$

In the system of FIG. 3, the algorithm of equation (3) is implemented in software so that the value of the tuning factor $\alpha_i$ is varied automatically as system error changes. Normally, large values of the error signals $E_i$ are associated with abrupt process changes such as are caused by sheet breaks, reel or grade changes. Under such conditions, the algorithm of equation (3) assures that the control system of FIG. 3 will be tightly tuned and, hence, will respond rapidly to process disturbances. On the other hand, small values of the system error $E_i$ are normally associated with stable process conditions. For small values of the system error, the algorithm of equation (3) assures that the control system will be loosely tuned, and accordingly, will respond slowly and stably to process changes.

An alternative embodiment of the present invention is illustrated in FIG. 4. In this embodiment, a signal processing device 61 is connected to receive the actuator signals $Y_i$ and to operate upon those signals to provide an output which determines the closed-loop time constant of the Smith Predictor controller C. More particularly, signal processing device 61 operates such that the value of the closed loop time constant $a_i$, is inversely related to the magnitude of the signal-to-noise ratio (S/N) of actuator signals at the output of the control system. In other words, a relatively large value of the signal-to-noise ratio of the actuator signals will produce a relatively small value for the closed-loop time constant $\alpha_i$ and, conversely, a relatively small value of the signal-to-noise ratio will produce a relatively large value of the closed-loop time constant. Thus, for a relatively large signal-to-noise ratio, the Smith Predictor controller will be tightly tuned and will respond quickly to process changes. Conversely, for relatively small values of the signal-to-noise ratio, the Smith Predictor controller will be loosely tuned and will respond slowly.

Signal processing device 61 can operate in various ways to determine the signal-to-noise ratio of the actuator signals. In the preferred embodiment, the ratio of low-frequency to high-frequency components in the actuator signals provides a proxy for the signal to noise ratio. The low and high frequency components of the actuator signals can be determined by, for example, Fast Fourier Transform techniques. Also, U.S. Pat. No. 3,610,899 teaches a method for obtaining long-term machine direction and short-term machine direction variances of a predetermined characteristic of a sheet material being manufactured. The methodology taught in that patent can be used by signal processor 61. Further, U.S. Pat. No. 4,707,779 teaches a method for obtaining short-term and long-term machine direction variations in sheet properties by a particular filtering technique; such methods also can be used by signal processor 61.

In normal operation of the system of FIG. 4, the closed-loop time constant $\alpha_i$ is under software control via signal processor 61 and is varied automatically as the signal-to-noise ratio of the actuator signals changes. In practice, large values of the signal-to-noise ratio are associated with abrupt process changes and small values of the signal-to-noise ratio are associated with stable process conditions. Accordingly, the system of FIG. 4 will respond relatively rapidly to rapidly changing process conditions and will respond relatively more slowly when the process is operating stably.

Another alternative embodiment of the present invention is illustrated in FIG. 4. In this embodiment, a signal processing device 67 is connected to receive the error signals $E_i$ and to provide an output which determines the closed-loop time constant of the Smith Predictor controller C as a function of the error signals $E_i$. More particularly, signal processing device 67 operates such that the value of the closed loop time constant, $a_i$, is inversely related to the magnitude of the signal-to-noise ratio (S/N) of the error signals. Here again, a relatively large value of the signal-to-noise ratio of the actuator signals will produce a relatively small value for the closed-loop time constant $\alpha_i$ and, conversely, a relatively small value of the signal-to-noise ratio will produce a relatively large value of the closed-loop time constant. It should be appreciated that the embodiments of FIGS. 4 and 5 are substantially equivalent, in accordance with the relationship $E_i = R_i - Y_i$.

Although the foregoing has described preferred embodiments of systems according to the present invention, those skilled in the art will appreciate that additions, modifications, substitutions and deletions which are not specifically described in the foregoing may be made without departing from the spirit and scope of the present invention as defined by the following claims. For example, although the present invention is preferably employed in conjunction with systems having a Smith Predictor controller, it is generally applicable to other types of time delay compensation control systems.

What is claimed is:

1. In a system for controlling a sheetmaking process using a time delay compensation control system such as a Smith Predictor control scheme, the improvement comprising: adjustment means for automatically varying the closed-loop time constant of the system as a function of the system error.

2. The improvement according to claim 1 wherein the adjustment means operates such that the closed-loop time constant is related inversely to system error.

3. The improvement according to claim 1 wherein system error, $E_i$, is measured by the magnitude of the difference between the control system output signals and preselected reference input signals.

4. The improvement according to claim 1 wherein the time delay compensation control system is one according to the Dahlin design.

5. In a system for controlling a sheetmaking process using a time delay compensation control system such as a Smith Predictor control scheme, the improvement comprising: adjustment means to automatically adjust the closed-loop time constant of the system as a function of the signal-to-noise ratio of signals related to the output signals of the control system.

6. The improvement according to claim 5 wherein the time delay compensation control system is one according to the Dahlin design.

7. The improvement according to claim 5 wherein the signals related to the output signals are equated to the output signals.

8. The improvement according to claim 5 wherein the signals related to the output signals are error signals, $E_i$, as determined by the relationship $E_i = R_i - Y_i$ were $R_i$ are reference signals and $Y_i$ are output signals from the control system.

9. A control system for controlling a sheetmaking process comprising:
a time delay compensation control system employing a Smith Predictor control scheme;
system error measurement means for measuring the magnitude, $E_i$, of the difference between output signals from the control system and preselected reference input signals;
adjustment means to automatically vary the closed-loop time constant of the system as a function of the system error such that the closed-loop time constant $\alpha_i$ is determined substantially according to the following functional relationship:

$$\alpha_i = \left(1 + \frac{E_{nom}}{E_i}\right) T_c$$

where $E_{nom}$ is the nominal error of the system and $T_c$ is the open-loop time constant for the system and where $E_{nom}$ is determined by the standard deviation of the system error signals.

10. A control system for controlling a sheetmaking process comprising:
a time delay compensation control system according to the Dahlin design having the following transfer function, k, for discrete signals, z:

$$k(z) = \frac{[1 - e^{-\lambda T}] z^{-k-1}}{1 - e^{-\lambda T} z^{-1}}$$

where T designates time and $\lambda$ designates the inverse of the closed-loop time constant $\alpha$; and
adjustment means for automatically varying the closed-loop time constant of the system as a function of the system error.

11. The improvement according to claim 10 wherein the time delay compensation control system is characterized by a transfer function substantially as follows:

$$G_{sp} = \frac{C}{1 + CG_m(1 - T_m)}$$

where $G_m$ represents a preselected model of the plant dynamics, $T_m$ represents a model of the plant time delay, and C represents the controller in the control system.

12. In a system for controlling a sheetmaking process using a time delay compensation control system such as a Smith Predictor control scheme, the improvement comprising adjustment means to automatically adjust the closed-loop time constant of the system such that the closed-loop time constant is related inversely to the signal-to-noise ratio of signals related to the output signals.

13. The improvement according to claim 12 wherein the ratio of low-frequency to high-frequency components in the signals related to the output signals provides a proxy for the signal-to-noise ratio.

14. In a system for controlling a sheetmaking process using a time delay compression control system according to the Dahlin design, the improvement comprising adjustment means to automatically adjust the closed-loop time constant of the system as a function of the signal-to-noise ratio of signals related to the output signals of the control system, with the time delay compensation control system having the following transfer function in the case of discrete signals:

$$k(z) = \frac{[1 - e^{-\lambda T}] z^{-k-1}}{1 - e^{-\lambda T} z^{-1}}$$

where T designates time and $\lambda$ designates the inverse of the closed-loop time constant $\alpha$; and
adjustment means for automatically varying the closed-loop time constant of the system as a function of the system error.

15. In a system for controlling a sheetmaking process using a time delay compensation control system such as a Smith Predictor control scheme, the improvement comprising: adjustment means to automatically adjust the closed-loop time constant of the system as a function of the signal-to-noise ratio of signals related to the output signals of the control system, and the time delay compensation control system having a transfer function substantially as follows:

$$G_{sp} = \frac{C}{1 + CG_m(1 - T_m)}$$

where $G_m$ represents a preselected model of the plant dynamics, $T_m$ represents a model of the plant time delay, and C represents the controller in the control system.

16. A system for controlling a continuous sheetmaking machine comprising:
a time delay compensation control system;
adjustment means to automatically adjust the closed-loop time constant of the time delay compensation control system such that the closed-loop time constant is related inversely to the signal-to-noise ratio of the output signals.

17. A system for controlling a continuous sheetmaking machine comprising:
a time delay compensation control system; and
adjustment means to automatically adjust the closed-loop time constant of the time delay compensation control system as a function of the ratio of low-frequency to high-frequency components in the actuator signals.

18. A system for controlling a continuous sheetmaking machine comprising:
a time delay compensation control system; and
adjustment means to automatically adjust the closed-loop time constant of the time delay compensation control system as a function related inversely to the system error.

19. A system for controlling a continuous sheetmaking machine comprising:
a time delay compensation control system; and
adjustment means to automatically adjust the closed-loop time constant, $\alpha$, of the time delay compensation control system as a function of system error, the adjustment means including summing means that provide input error signals $E_i$ to the adjustment means equal to the difference between the output signals from the control system and preselected reference input signals.

20. The system according to claim 19 wherein the adjustment means operates such that the closed-loop time constant $a_i$ is determined according to the following functional relationship:

$$a_i = \left(1 + \frac{E_{nom}}{E_i}\right)T_c$$

where $E_{nom}$ is the nominal error of the system and $T_c$ is the open-loop time constant for the system.

21. In a system for controlling a sheetmaking process using a time delay compensation control system such as a Smith Predictor control scheme, the improvement comprising:

adjustment means to automatically vary the closed-loop time constant $a$ of the system according to the following functional relationship:

$$a_i = \left(1 + \frac{E_{nom}}{E_i}\right)T_c$$

where $E_{nom}$ is the nominal error of the system, $T_c$ is the open-loop time constant for the system, and $E_i$ is the system error as measured by the magnitude of the difference between the control system output signals and preselected reference input signals.

22. The improvement according claim 21 wherein the nominal error is determined by the standard deviation of the system error signals.

23. The improvement according to claim 21 wherein the nominal error is equated to about twice the standard deviation of the system error signals.

24. A system for controlling a continuous sheetmaking machine comprising:

a time delay compensation control system; and adjustment means to automatically adjust the closed-loop time constant, $a$, of the time delay compensation control system as a function of system error, the adjustment means including summing means that provide input error signals $E_i$ to the adjustment means equal to the difference between the output signals from the control system and preselected reference input signals, with the adjustment means operating such that the closed-loop time constant $a_i$ is determined according to the following functional relationship:

$$a_i = \left(1 + \frac{E_{nom}}{E_i}\right)T_c$$

where $E_{nom}$ is the nominal error of the system and $T_c$ is the open-loop time constant for the system.

* * * * *